Jan. 23, 1968    R. S. DAVIDSON, JR    3,365,594
SOLID STATE SYNCHRO
Filed Aug. 31, 1964    2 Sheets-Sheet 1

INVENTOR.
RICHARD S. DAVIDSON JR,
BY Robert Thompson
ATTORNEY.

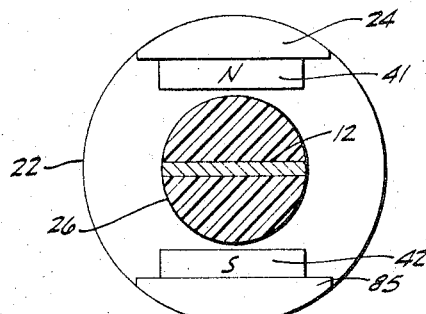
FIG. 5.
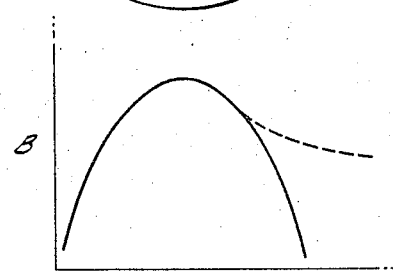
FIG. 6.
FIG. 7.
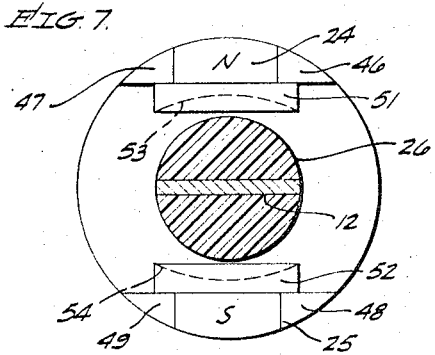
FIG. 9.
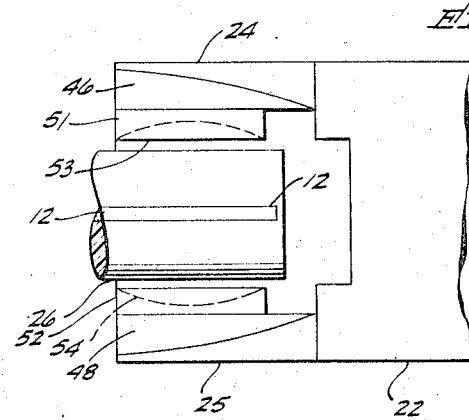
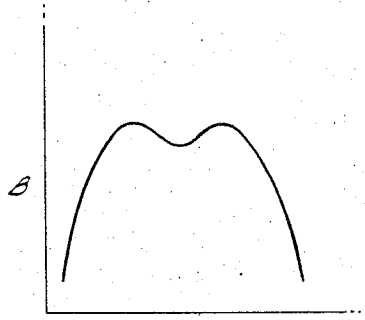
FIG. 8.
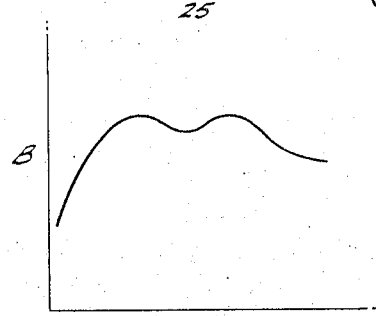
FIG. 10.

United States Patent Office 3,365,594
Patented Jan. 23, 1968

3,365,594
SOLID STATE SYNCHRO
Richard S. Davidson, Jr., Palos Verdes, Calif., assignor to Hughes Aircraft Company, Culver City, Calif., a corporation of Delaware
Filed Aug. 31, 1964, Ser. No. 393,284
12 Claims. (Cl. 310—10)

ABSTRACT OF THE DISCLOSURE

A Hall-effect synchro device is disclosed showing a rotatable bifurcated permanent magnet presenting opposed north-south poles arranged about the axis of rotation and located within a nonmagnetic housing. A Hall-effect device is encapsulated in an appropriate resin, deposited within a cavity intermediate the magnetic poles and is fixed to the nonmagnetic housing to prevent rotation thereof. Electrical leads for power input and signal output extend from the encapsulated package. Upon rotation of the magnetic poles in relation to the Hall-effect device, an output signal proportional to the sine of the angle instantaneously existing between the magnetic field and the plane of the Hall generator is achieved.

---

This invention relates to an improved synchro and more particularly to an improved solid state synchro which uses a Hall-effect generator to provide a voltage signal which is indicative of the angular position of the synchro.

Heretofore, it has been noted that the rotation of a flat rectangular Hall-effect generator relative to uniform magnetic field will produce a Hall-effect voltage which is a trigonometric (sinusoidal or cosinusoidal) voltage function of the angle of rotation. One article of an experimental study of this type has been published in the magazine Electromechanical Design, January 1961, pages 14, 15, 19 and 20 entitled, "Hall-Effect Generators for Solid State Synchro and Resolvers," by S. Harac and O. Tischler. These experiments appear to pertain to a more sophisticated Hall-effect utilization than the applications of Hall-effect simply described in the magazine, "Semiconductor Products, of May 1960, pages 39 through 44, entitled. "The Hall-Effect Applications in Electrical Measurements," by L. E. Fay III or the devices simply described in the magazine, Space/Aeronautics, May 1961, pages 145 through 168.

In conjunction with this study, solid state synchros of the type having multiple Hall-effect generators positioned about a rotary magnet were developed. Several of these prior art synchro and resolvers are illustrated in the magazine, Military Systems Design, November/December 1961, pages 4 through 9 entitled, "Brushless and Windingless Components," by Z. R. S. Ratajski. A study of these devices has indicated that they are accurate to an angle of about one and one-half degrees probably because of the nonlinear magnetic effects.

Originally it was believed that the use of a nonuniform magnetic field was not practical. Investigation of non-linear magnetic edge effects by E. Mark Gold (Journal of Applied Physics, May 1963, vol. 34, No. 5, pages 1424 and 1425 in an article entitled, "Error in Hall Cell Angle Measurement Due to Magnetic Edge Effects"), seemed to preclude a practical development of accurate synchro configurations using a single Hall generator positioned to rotate between a pair of diametrically opposed magnetic poles. An analysis of the derivations of gold indicated that an error of about 3° of rotation would occur if a practical device of the above type were to be developed.

It has now been discovered in conjunction with the embodiments of the following description that by fabricating the components into a simple and unique configuration the magnetic edge effects are not as great a problem as previously believed, and it is therefore possible to provide an improved solid state synchro having a high degree of accuracy.

Accordingly, an object is to overcome the accuracy problems of prior art Hall-effect synchros or rotary transducers.

Another object is to provide an improved simple reliable highly accurate Hall-effect synchro having few moving parts.

The above and other objectives pertaining to this discovery have been accomplished by providing a thin flat Hall-effect generator which is mounted for relative rotation within a bifurcated magnetic field piece. Ideally, the Hall-effect generator is mounted stationary relative to a current supply source and a Hall voltage sensing circuit, thereby avoiding the need for a use of slip rings for current conduction. To obtain relative rotation between the Hall-effect generator and a magnetic field the bifurcated magnetic field piece is adapted to rotate about the outside of the Hall-effect generator. With such relative rotation the output Hall voltage obtained can be thought of as a cosinusoidal voltage function of the angle between the resultant magnetic field between pole pieces and the plane of the Hall-effect generator. To obtain this output the Hall generator is positioned symmetrically within a nonuniform symmetrical magnetic field and rotated relative thereto.

Increased output signal accuracy can be obtained from this configuration by reducing the shape and size of the magnetic pole pieces to a pair of diametrically opposed substantially cylindrical pole face members and shaping the circular faces of these members into a concave configuration. By symmetrically positioning the Hall-effect generator within the magnetic field developed by these diametrically opposed members, a highly accurate output Hall voltage is obtained.

Other objects, features, and advantages of this discovery will become apparent upon reading the following detailed description of several embodiments of this invention and referred to the accompanying drawings in which:

FIG. 5 is an enlarged sectional view of the type of FIG. 4 illustrating another embodiment of the magnetic pole pieces;

FIG. 6 is a graph showing a plot of the magnetic field strength B between the pole pieces of FIG. 5 in a plane transversely through the magnetic field;

FIG. 7 is an enlarged sectional view of the type of FIG. 4 showing a preferred embodiment of the magnetic pole pieces in which the faces thereof are concave;

FIG. 8 is a graph illustrating a plot of the magnetic field strength B between the pole pieces of FIG. 7;

FIG. 9 is an enlarged side elevational view of the pole pieces of the preferred embodiment of FIG. 7; and FIG. 10 is a graph illustrating a plot of the magnetic field strength B between the pole pieces of FIG. 9.

Figure 1:
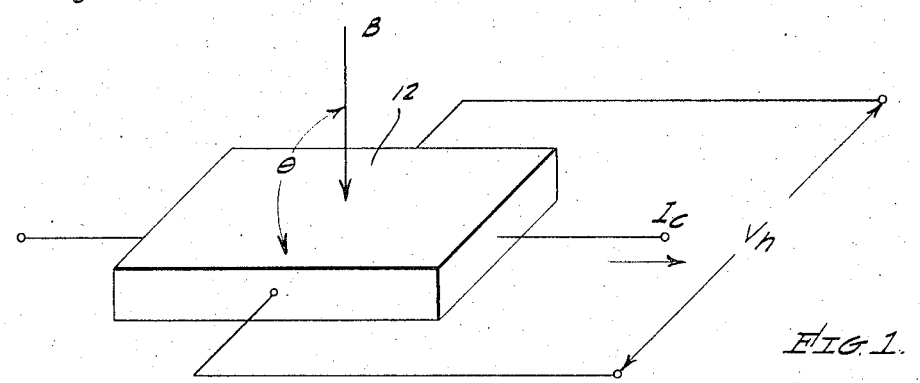
FIG. 1 is a schematic perspective view of an elementary Hall generator.
Figure 4:
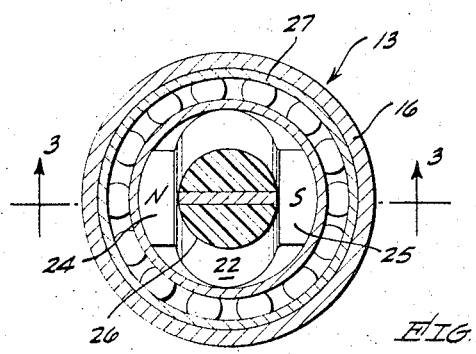
FIG. 4 is an enlarged cross-sectional view taken along the line 4—4 of FIG. 3.

In general when a control current $I_c$ is conducted along the longitudinal axis of a Hall generator wafer 12, such as in FIG. 1, and the wafer is placed in a magnetic field with the magnetic lines of force B passing through the wafer in a direction substantially perpendicular to the plane of the wafer a Hall voltage $V_h$ is created transversely through the wafer or in a direction perpendicular to the direction of the resultant current flow $I_c$. This Hall voltage $V_h$ is believed to be created by the redistribution of charge carriers within the wafer due to the combined effect of an electric and magnetic field upon the carriers.

The Hall voltage can be further explained or defined according to the following relationship:

$$V_h = KI_cB \sin \theta$$

where $V_h$ = Hall voltage
$K$ = Material sensitivity constant
$I_c$ = control current
$B$ = flux density of the magnetic field
$\theta$ = the angle between the resultant magnetic field and the plane of the Hall generator wafer.

When the control current $I_c$ is constant and the magnetic field B is constant the Hall voltage relationship becomes $V_h = K_1 \sin \theta$. Thus, by rotating the Hall generator wafer 12 about its longitudinal axis within the magnetic field B it is possible to create a Hall voltage $V_h$ which is directly proportional to the sine of the angle of rotation. Several suitable Hall-effect materials include: indium arsenide, indium antimonide, indium antimonide phosphide, germanium, and silicon. It should be understood that both vapor deposited film or solid wafers of any suitable material can be used.

Figure 2:
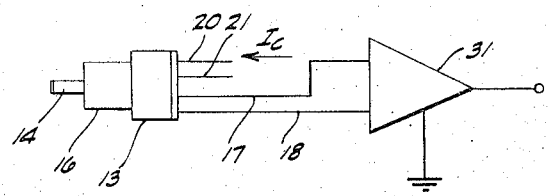
FIG. 2 is a side elevational view of an improved solid state synchro embodying the principles taught herein.

Referring now to the structure of the improved solid state synchro, FIG. 2 is a side view of the synchro 13 in which a rotatable nonmagnetic input shaft 14 extends through one end wall of a nonmagnetic case 16 to control the magnitude of a Hall voltage $V_h$ appearing across the output leads 17 and 18 when a control current $I_c$ is supplied to the Hall generator wafer (not shown) by control leads 20 and 21.

Figure 3:
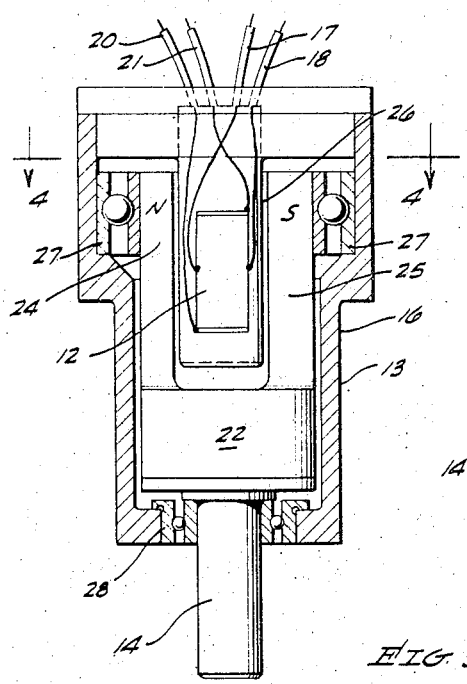
FIG. 3 is an enlarged longitudinal cross-section of the solid state synchro of FIG. 2.

Referring to the details of the synchro 13, in FIG. 3 the nonmagnetic brass case 16 is illustrated in cross-section to expose the stationary Hall generator wafer 12 and a rotatable, bifurcated, magnetic field piece 22. The rotatable magnetic field piece 22, which can be made of any suitable material such as Alnico V or Alnico II, is fastened to one end of the nonmagnetic input shaft 14 by means of a shouldered flange 23. Suitable fastening means would include many of the epoxy resins, adhesives, welding, soldering or mechanical fasteners. The opposite face of the magnetic field piece 22 includes a pair of parallel magnetic pole pieces 24 and 25 which are formed to extend into the interior of the brass case symmetrically about the axis of rotation to create a symmetrical magnetic field therebetween.

The stationary Hall generator wafer 12 is symmetrically positioned along a central axis between the diametrically opposed parallel pole pieces 24 and 25 and is encapsulated within a cylindrical cast epoxy resin member 26 having high dielectric properties, and high thermal and structural strength. The cast epoxy member 26 has a wide flange which is fastened to the nonmagnetic brass case 16 by any conventional adhesive or fastener to prevent rotation of the Hall generator 12 relative to the case 16.

For low friction rotation of the magnetic circuit, the input shaft 14 and the magnetic field piece 22 are supported by an upper ball bearing 27 and a lower ball bearing 28. The upper ball bearing 27 is mounted adjacent the inner wall of the nonmagnetic case 16 to annularly surround and radially support the bifurcated magnetic pole pieces 24 and 25. For axial support the upper ball bearing 27 can be press-fitted between the case 16 and the pole pieces 24 and 25. The lower ball bearing 28 is mounted within an aperture in the bottom wall of the nonmagnetic case 16 and supports the input shaft 14 both radially and axially. In operation the ball bearings maintain the rotatable pole pieces 24 and 25 in a centered symmetrical relationship with the stationary Hall generator wafer 12. As a result of this configuration, variations in the magnetic field pattern due to axial wabble are held to a minimum during rotation. For additional magnetic field consistency, the ball bearings 27 and 28 can be made of nonmagnetic material such as a beryllium-copper alloy.

In operation, the magnetic field is rotated relative to the Hall generator wafer 12 by rotating the bifurcated magnetic field member 22. Thus, as the input shaft 14 is rotated, the attached magnetic field piece 22 is also rotated to provide symmetrical rotation of the magnetic field. As the magnetic pole pieces 24 and 25 are rotatably positioned about the stationary Hall generator wafer 12, a variable magnitude Hall voltage, which is directly proportional to the sine of the angle between the resultant magnetic field and the plane of the wafer 12, is developed across the output leads 17 and 18 when a control current $I_c$ is supplied over control leads 20 and 21.

By maintaining the Hall generator wafer 12 stationary relative to the case 16 it is possible to eliminate the need for slip rings and brushes for supplying the control current $I_c$ through the control leads 20 and 21 and for picking off the Hall voltage $V_h$ from the output leads 17 and 18. As a result there is less chance for signal error or low frequency noise signals to develop than would be the case with brush type contacts and commutators.

One synchro which has been built and tested had an overall axial length of 0.85" and an outside diameter of 0.45". In the magnetic circuit the bifurcated magnetic pole pieces 24 and 25 had a height of 0.325", a face width of 0.1375" and were spaced apart about 0.15". The Hall generator circuit included an Ohio semiconductor HP–310 solid crystal wafer of indium-arsenide and was encapsulated in a cylindrical member of epoxy resin (Hysol–4183) having a length of 0.3" and a diameter of 0.125". The dimensions of Hall generator 12 were a length of 0.375", a width of 0.125" and a thickness of 0.017".

Tests run on this device provided data which indicated the synchro had a maximum error of about 33 minutes of arc.

In order to amplify the Hall voltage $V_h$ to a suitable level, a high gain stable amplifier 31 can be connected to the output leads 17 and 18. A representative integrated circuit amplifier that could be used is illustrated in the Series 52 Application Report, Semiconductor Networks by Texas Instruments Incorporated SC–4717–164, page 1.

Instead of variable magnitude D.C. Hall voltage output $V_h$ it would be possible to change the Hall voltage $V_h$ to a modulated A.C. signal by applying an A.C. control current $I_c$ to the Hall generator 12. The envelope of the output signal would be directly proportional to the cosine of the angle between the resultant magnetic field and the plane of the Hall generator 12.

In another embodiment fo the synchro 13, the effective length of the magnetic pole pieces is reduced as illustrated in FIG. 5, thereby allowing an additional shortening of the entire synchro unit. By forming the ends of the magnetic pole pieces 24 and 25 with two cylindrical pole face members 41 and 42, it is possible to obtain a substantially symmetrical magnetic field such as graphically illustrated in FIG. 6. An experimental plot of the magnetic field strength taken transversely from left to right between the pole faces of FIG. 5 would vary generally as illustrated by the solid line taken from left to right on the graph in FIG. 6. A second magnetic field plot taken three dimensionally into the plane of the paper (FIG. 5) would produce a plot from left to right which would be substantially the same as the preceding plot with the exception that one end thereof would taper off because of the magnetic field developed between the bifurcated magnetic pole pieces 24 and 25 which support the pole faces.

Thus, it has been discovered that by symmetrically placing the Hall generator 12 within this magnetic field so developed it is possible to generate a highly accurate Hall voltage $V_h$ which is very close to a sinusoidal function of the angle between the plane of the Hall generator 12 and the resultant magnetic field.

In a preferred embodiment of the synchro 13, the configuration of the magnetic pole faces can be further changed to obtain even greater accuracy of the output Hall voltage $V_h$. In this embodiment (FIGS. 7 and 9) the magnetic pole pieces 24 and 25 have tapered sides 46–47 and 48–49 to form a truncated triangular silhouette when viewed from the face thereof. A first and a second cylindrical pole face member 51 and 52 respectively are fastened to the inner flat wall of the magnetic pole pieces 24 and 25 by either welding or any conventional chemical adhesive such as Hysol I-c epoxy resin. The pole faces 53 and 54 are concave and preferably identical in contour with one another. In one embodiment which has been constructed the pole faces are spherical.

An experimental plot of the magnetic field strength taken transversely from left to right between the concave pole faces of FIG. 7 would vary generally as illustrated by the reversely curved line on the graph of FIG. 8. A second experimental plot of the magnetic field strength taken transversely from left to right between the concave pole faces of FIG. 9 would vary generally as illustrated by the reversely curved line taken from left to right on the graph of FIG. 10.

It has been discovered that by symmetrically placing the Hall generator 12 within the magnetic field so developed, it is possible to generate a highly accurate Hall voltage $V_h$ which is virtually a sinusoidal function of the instantaneous angle between the plane of the Hall generator 12 and the resultant magnetic field.

In a synchro embodying the preferred features, the general dimensions of a model which was constructed and tested were the same except for the overall length which was shorter, and the details of the pole pieces. The cylindrical pole face members 41 and 42 had a thickness of 0.055″ and a diameter of 0.25″. The pole faces 51 and 52 were spherical about a 0.25″ center. The material used for the pole face members was conventional relay steel.

Test run on this device provided information which indicated that the synchro had a maximum error of about 20 minutes of arc.

In all of the embodiments the width of the pole pieces is about the same as the width of the Hall generator wafer 12. An important advantage of this feature is that the overall size of the synchro is small for the accuracy obtained.

While the salient features of the invention have been illustrated and described with respect to particular embodiments, it should be readily apparent that numerous modifications may be made within the spirit and scope of the invention and it is therefore not desired to limit the invention to the exact details shown.

What is claimed is:

1. In a Hall-effect synchro of the type having a central axis of rotation, the improvement comprising: a magnetic circuit including magnetic field piece means having a pair of parallel pole pieces mounted symmetrically about the axis of rotation, and a pair of substantially arcuate pole face members secured to said pole pieces diametrically opposite one another, said magnetic circuit forming a symmetrical magnetic field between said parallel pole pieces; means connected to rotate said magnetic circuit about the axis of rotation; and a Hall voltage generator means secured to project symmetrically between said parallel pole pieces along the axis of rotation whereby a Hall voltage is created which has an instantaneous magnitude directly proportional to the sinusoidal function of the angle between the resultant magnetic field and the plane of said Hall generator as said magnetic circuit is rotated about said Hall generator.

2. A Hall-effect synchro of the type having a central axis of rotation according to claim 1,
wherein said symmetrical magnetic field is symmetrical about said axis of rotation when viewed in a plane perpendicular to and transverse of said axis of rotation.

3. A Hall-effect synchro of the type having a central axis of rotation according to claim 2,
wherein said pole pieces are formed having outwardly tapering edges in the area of projection of said generator means between said pole pieces whereby a nonuniform magnetic field is provided between the pole pieces when viewed in a plane passing through the axis of rotation and generally perpendicular to said pole pieces.

4. In a Hall-effect synchro of the type having a central axis of rotation, the improvement comprising: a magnetic circuit including a bifurcated magnetic field piece having a pair of parallel pole pieces mounted symmetrically about the axis of rotation, and a pair of substantially cylindrical pole face members secured to said parallel pole pieces diametrically opposite one another, said magnetic circuit being operable to form a symmetrical magnetic field between said pole pieces; a nonmagnetic means connected to rotate said magnetic circuit about the axis of rotation; and a Hall voltage generator means secured to project symmetrically between said pole pieces along the axis of rotation whereby a Hall voltage is created which has an instantaneous magnitude directly proportional to the sinusoidal function of the angle between the resultant magnetic field and the plane of said Hall generator as said magnetic circuit is rotated about said Hall generator.

5. In a Hall-effect synchro of the type having a central axis of rotation, the improvement comprising: a magnetic circuit including a bifurcated magnetic field piece having a pair of parallel pole pieces mounted symmetrically about the axis of rotation, and a pair of substantially cylindrical pole face members secured to said parallel pole pieces diametrically opposite one another, said magnetic circuit being operable to form a symmetrical magnetic field between said pole pieces; a nonmagnetic case adapted to rotatably receive said magnetic circuit; a nonmagnetic member connected to rotate said magnetic circuit about the axis of rotation, one end of said nonmagnetic member projecting from said nonmagnetic case; and a Hall voltage generator means secured to project symmetrically between said parallel pole pieces along the axis of rotation whereby a Hall voltage is created which has an instantaneous magnitude directly proportional to the sinusoidal function of the angle between the resultant magnetic field and the plane of said Hall generator as said magnetic circuit is rotated about said Hall generator.

6. In a Hall-effect synchro of the type having a central axis of rotation, the improvement comprising: a rotatable magnetic circuit including a bifurcated magnetic field piece having a pair of parallel pole pieces mounted symmetrically about the axis of rotation, and a pair of substantially cylindrical pole face members secured to said parallel pole pieces diametrically opposite one another said magnetic circuit being operable to form a nonuniform symmetrical magnetic field between said parallel pole pieces when viewed in a plane transverse to said axis of rotation; a nonmagnetic case adapted to rotatably receive said magnetic circuit; a nonmagnetic member connected to rotate said magnetic circuit about the axis of rotation, one end of said nonmagnetic member projecting from said nonmagnetic case; a Hall voltage generator wafer; and a resin encapsulating means surrounding said Hall voltage generator wafer, said encapsulating means being secured to said nonmagnetic case to support said Hall generator wafer in nonrotatable projection symmetrically between said parallel pole pieces along the central axis of rotation whereby a Hall voltage is created which has an instantaneous magnitude directly proportional to the sinusoidal function of the angle between the resultant magnetic field and the plane of said Hall generator as said magnetic circuit is rotated about said Hall generator.

7. In a Hall-effect synchro of the type having a central axis of rotation, the improvement comprising: a rotatable magnetic circuit including a bifurcated magnetic field piece having a pair of parallel pole pieces mounted symmetrically about the axis of rotation, said magnetic circuit being operable to form a nonuniform symmetrical magnetic field between said parallel pole pieces when viewed in a plane transverse to said axis of rotation; a nonmagnetic case adapted to rotatably receive said magnetic circuit; a nonmagnetic member connected to rotate said magnetic circuit about the axis of rotation, one end of said nonmagnetic member projecting from said nonmagnetic case; a Hall voltage generator wafer having a width of about the same width as the diameter of said cylindrical pole face members; and a resin encapsulating means surrounding said Hall voltage generator wafer, said encapsulating means being secured to said nonmagnetic case to support said Hall generator wafer in nonrotatable projection symmetrically between said parallel pole pieces along the central axis of rotation whereby a Hall voltage is created which has an instantaneous magnitude directly proportional to the sinusoidal function of the angle between the resultant magnetic field and the plane of said Hall generator as said magnetic circuit is rotated about said Hall generator.

8. In a Hall-effect synchro of the type having a central axis of rotation, the improvement comprising: a magnetic circuit including a bifurcated magnetic field piece having a pair of parallel pole pieces mounted symmetrically about the axis of rotation, and a pair of substantially cylindrical pole face members secured to said parallel pole pieces diametrically opposite one another, the face of said face members having a concave contour, said magnetic circuit forming a symmetrical magnetic field between said pole pieces; means connected to rotate said magnetic circuit about the axis of rotation; and a Hall voltage generator means secured to project symmetrically between said parallel pole pieces along the axis of rotation whereby a Hall voltage is created which has an instantaneous magnitude directly proportional to the sinusoidal function of the angle between the resultant magnetic field and the plane of said Hall generator as said magnetic circuit is rotated about said Hall generator.

9. In a Hall-effect synchro of the type having a central axis of rotation, the improvement comprising: a magnetic circuit including a bifurcated magnetic field piece having a pair of parallel pole pieces mounted symmetrically about the axis of rotation and a pair of substantially cylindrical pole face members secured to said parallel pole pieces diametrically opposite one another, the face of said face members having a concave contour, said magnetic circuit being operable to form a symmetrical magnetic field between said pole pieces; a nonmagnetic member connected to rotate said magnetic circuit about the axis of rotation; and a Hall voltage generator means secured to project symmetrically between said parallel pole pieces along the axis of rotation whereby a Hall voltage is created which has an instantaneous magnitude directly proportional to the sinusoidal function of the angle between the resultant magnetic field and the plane of said Hall generator as said magnetic circuit is rotated about said Hall generator.

10. In a Hall-effect synchro of the type having a central axis of rotation, the improvement comprising: a magnetic circuit including a bifurcated magnetic field piece having a pair of parallel pole pieces mounted symmetrically about the axis of rotation and a pair of substantially cylindrical pole face members secured to said parallel pole pieces diametrically opposite one another, the face of said members having a concave contour, said magnetic circuit being operable to form a symmetrical magnetic field between said pole pieces; a nonmagnetic case adapted to rotatably receive said magnetic circuit; a nonmagnetic member connected to rotate said magnetic circuit about the axis of rotation, one end of said nonmagnetic member projecting from said nonmagnetic case; and a Hall voltage generator means secured to project symmetrically between said parallel pole pieces along the axis of rotation whereby a Hall voltage is created which has an instantaneous magnitude directly proportional to the sinusoidal function of the angle between the resultant magnetic field and the plane of said Hall generator as said magnetic circuit is rotated about said Hall generator.

11. In a Hall-effect synchro of the type having a central axis of rotation, the improvement comprising: a rotatable magnetic circuit including a bifurcated magnetic field piece having a pair of parallel pole pieces mounted symmetrically about the axis of rotation and a pair of substantially cylindrical pole face members secured to said parallel pole pieces diametrically opposite one another, the sides of said pole pieces being tapered outwardly in relation to said axis of rotation, the face of said members having a concave contour, said magnetic circuit being operable to form a nonuniform symmetrical magnetic field between said parallel pole pieces when viewed in planes transverse to and congruent with said axis of rotation; a nonmagnetic case adapted to rotatably receive said magnetic circuit; a nonmagnetic member connected to rotate said magnetic circuit about the axis of rotation, one end of said nonmagnetic member projecting from said nonmagnetic case; a Hall voltage generator wafer; and a resin encapsulating means surrounding said Hall voltage generator wafer, said encapsulating means being secured to said nonmagnetic case to support said Hall generator wafer in nonrotatable projection symmetrically between said parallel pole pieces along the central axis of rotation whereby a Hall voltage is created which has an instantaneous magnitude directly proportional to the sinusoidal function of the angle between the resultant magnetic field and the plane of said Hall generator as said magnetic circuit is rotated about said Hall generator.

12. In a Hall-effect synchro of the type having a central axis of rotation an improvement comprising: a rotatable magnetic circuit including a bifurcated field piece having a pair of parallel pole pieces mounted symmetrically about the axis of rotation, said pole pieces being formed whereby said magnetic circuit is operable to create a symmetrical nonuniform magnetic field between said parallel pole pieces when viewed in planes transverse to and congruent with said axis of rotation; a nonmagnetic case adapted to rotatably receive and surround said magnetic circuit; nonmagnetic ball-bearing means mounted within said magnetic case to rotatably support said magnetic circuit; a nonmagnetic input shaft connected to rotate said magnetic circuit about the axis of rotation, one end of said nonmagnetic shaft projecting from said nonmagnetic case; and a stationary flat rectangular Hall voltage generator means secured to said nonmagnetic case for symmetrical projection between said parallel pole pieces along the axis of rotation whereby a Hall voltage is created which has an instantaneous magnitude directly proportional to the sinusoidal function of the angle between the resultant magnetic field and the plane of said Hall generator as said magnetic circuit is rotated about said Hall generator.

References Cited

UNITED STATES PATENTS

| 3,147,426 | 9/1964 | Metzger | 338—32 X |
| 3,184,620 | 5/1965 | Leibowitz et al. | 310—2 |
| 3,266,003 | 8/1966 | Nieda | 338—32 |

FOREIGN PATENTS 853,329  11/1960  Great Britain.

DAVID X. SLINEY, *Primary Examiner.*